United States Patent [19]

Tillotson

[11] 4,171,395
[45] Oct. 16, 1979

[54] METHOD AND APPARATUS FOR FORMING A LAYER OF FOAM URETHANE ON A CARPET BACKING AND PRODUCT

[76] Inventor: John G. Tillotson, Rte. 1, Box 20, Dalton, Ga. 30720

[21] Appl. No.: 782,636

[22] Filed: Mar. 30, 1977

[51] Int. Cl.² ............................................. B32B 3/02
[52] U.S. Cl. ........................................ 428/95; 156/72; 156/79; 156/322; 156/499; 156/543; 156/555; 428/97; 428/310; 428/315; 428/425
[58] Field of Search ............... 428/93, 95, 97, 310, 428/315, 425; 156/72, 79, 322, 499, 543, 555

[56] References Cited

U.S. PATENT DOCUMENTS

| | | | |
|---|---|---|---|
| 3,519,526 | 7/1970 | Carey | 428/95 |
| 3,679,469 | 7/1972 | Moore | 428/97 |
| 3,700,515 | 10/1972 | Terry | 156/79 |
| 3,705,834 | 12/1972 | Terry | 156/79 |
| 3,975,562 | 8/1976 | Madebach | 428/310 |

*Primary Examiner*—Marion E. McCamish
*Attorney, Agent, or Firm*—Jones, Thomas & Askew

[57] ABSTRACT

A method of forming a layer of blown cellular urethane on a carpet backing comprising the steps of providing a mixture of reactive urethane forming agents, shaping the reactive mixture into a layer upon a latex film, applying the underside of a heated carpet backing directly to the layer of reactive mixture, and heating the layer of reactive mixture to expedite reaction of the reactive mixture and chemical blowing of the reactive mixture into an enlarged layer of cellular urethane on the carpet backing between the backing and the latex film. Apparatus for performing the method is disclosed as is the resultant product.

13 Claims, 1 Drawing Figure

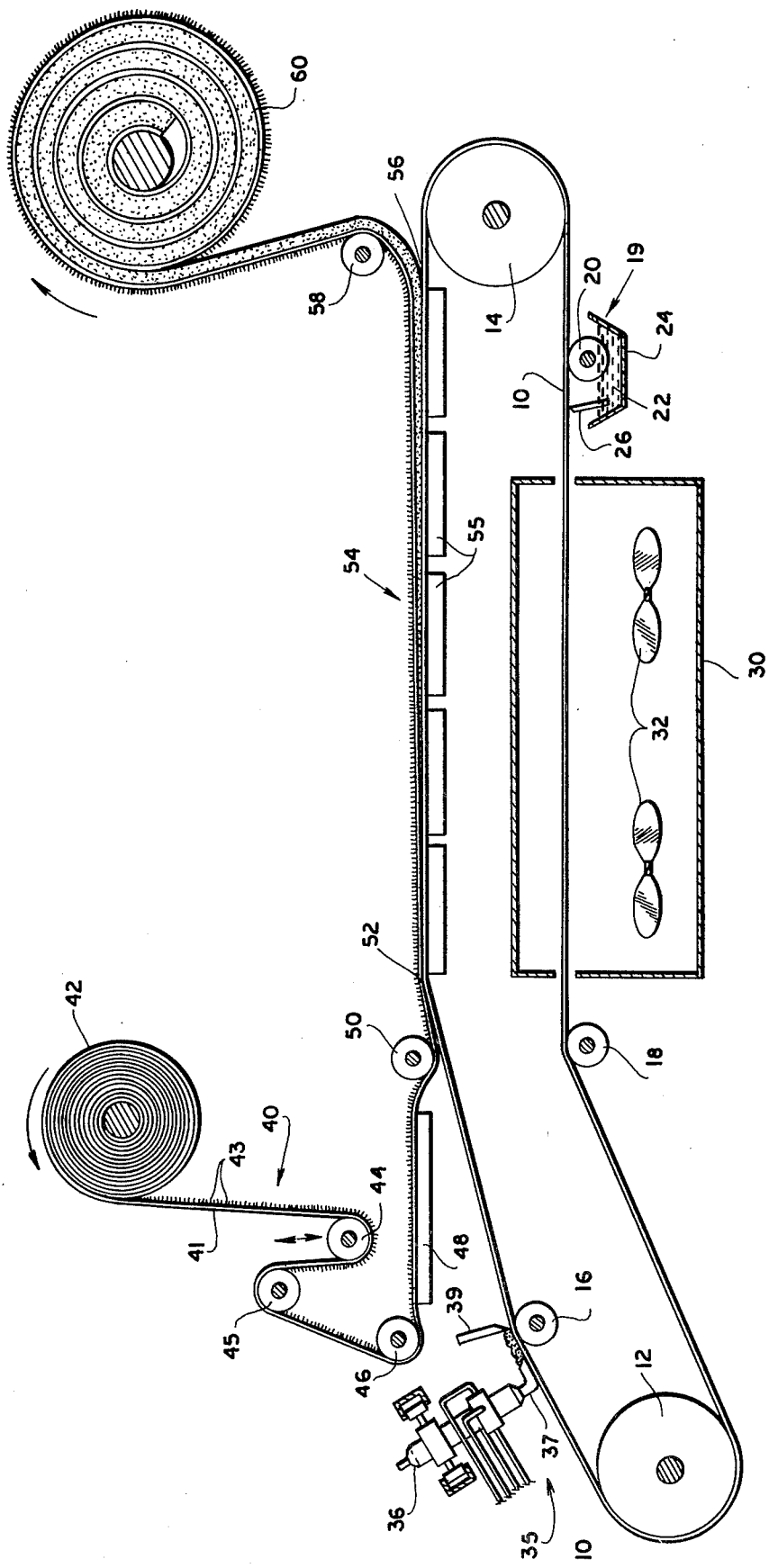

METHOD AND APPARATUS FOR FORMING A LAYER OF FOAM URETHANE ON A CARPET BACKING AND PRODUCT

BACKGROUND OF THE INVENTION

This invention relates to a method and apparatus for forming a layer of blown cellular urethane on a carpet backing, and to a carpet having an integral blown cellular urethane cushion.

Heretofore, as exemplified by the apparatus disclosed in U.S. Pat. Nos. 3,700,515; 3,705,834; 3,806,385; 3,834,961; which patents are assigned to assignee of the present application, and the following patents which are assigned to others—U.S. Pat. Nos. 2,950,221; 3,047,449; 3,123,508; 3,175,936; 3,206,343; 3,219,502; 3,257,483; 3,240,655; 3,453,168; 3,519,526; 3,686,046; 3,730,822; 3,772,224; 3,849,156; 3,862,879; 3,874,964; 3,926,700; 3,947,386; 3,959,191; 2,993,813; 3,013,924; 3,034,942; 3,046,177; 3,085,896; 3,181,199; 3,269,882; 3,399,107; 3,475,522; 3,650,880; 3,748,217; 3,844,862; 3,923,938; 3,939,235; 3,941,633; German Pat. Nos. 1,469,534; 1,952,397; 2,255,149; 2,208,995; 1,917,424; 1,948,527; 1,619,583; and 2,223,658; methods and apparatuses have been devised for forming urethane foam cushions or pads on fabric carpet backings. None of these previous methods or apparatuses has proven satisfactory and none has achieved any significant commercial success. In many of the previous methods, the unreacted urethane reactants are applied directly to the underside of the carpet primary backing. The primary backing has tuft loops or weave strands exposed on and protruding from its underside. The texture and porosity of these backings has limited the effectiveness of the application method which in turn has resulted in the formation of carpet cushions of uneven thickness once the urethane has expanded and cured.

Accordingly, it is an object of the present invention to provide an improved method for forming a layer of blown cellular urethane on a carpet fabric backing.

Another object of the invention is to provide improved apparatus for forming a layer of blown cellular urethane on a carpet fabric backing.

Yet another object of the invention is to provide an improved carpet of the type having a layer of blown cellular urethane on its underside.

These and other objects, features and advantages of the present invention will be apparent from reviewing the following more detailed description of the invention.

SUMMARY OF THE INVENTION

In one form of the invention, a method of forming a layer of blown cellular urethane on a carpet fabric backing is provided which comprises the steps of providing a mixture of reactive urethane forming agents, shaping the reactive mixture into a layer, and applying the underside of a heated carpet backing fabric to the layer of reactive mixture. The layer of reactive mixture is then heated to expedite curing and chemical blowing of the reactive mixture to form an enlarged layer of cellular urethane on the carpet backing fabric.

In another form of the invention a method of forming a blown cellular urethane cushion on a carpet fabric backing is provided that comprises the steps of preparing a mixture of reactive foam urethane forming agents, providing a latex film, and depositing the reactive mixture on the latex film. The reactive mixture is then shaped into a layer which, together with the film, is then applied to the underside of a pre-heated carpet backing fabric. The layer of reactive mixture is then heated to expedite reaction and chemical blowing thereof to form a cellular urethane cushion.

In an additional form of the invention, apparatus is provided for forming a layer of blown cellular urethane on the underside of a carpet backing fabric. The apparatus comprises an endless conveyor belt, means for driving the belt along a conveyor path, means for coating a latex film onto the conveyor belt, and means for mixing together reactive urethane forming agents and for depositing the mixture onto the latex film on the conveyor belt. The apparatus also includes means for shaping the deposited reactive mixture into a layer on the conveyor belt and second conveyor means for conveying the underside of a pre-heated carpet backing fabric into flush contact with the layer of reactive mixture. Means are also provided for heating the layer of reactive mixture while it is in flush contact with the underside of the carpet backing fabric thereby expediting reaction of the reactive mixture to simultaneously form a urethane material and chemically blow into a cellular condition on the carpet backing fabric.

In a further form of the invention a carpet is provided having a fabric backing, a layer of blown cellular urethane material on the fabric backing, and a latex film on said layer of blown urethane material.

BRIEF DESCRIPTION OF THE DRAWING

The FIGURE is a schematic diagram of apparatus for forming a layer of blown cellular urethane on a carpet backing fabric embodying principles of the invention.

DESCRIPTION OF THE PREFERRED EMBODIMENTS

Referring now in more detail to the drawing, there is shown apparatus comprising an endless conveyor belt 10 extending along an endless conveyor path over a pair of drive rollers 12 and 14, which are driven by unshown motor means, and a pair of idler rollers 16 and 18. From drive roller 14, the conveyor belt, which preferably is made of Teflon coated fiberglass, is seen to pass through a film coating station 19 consisting of an applicator roller 20 partially submerged in a liquid mixture 22 of acrylic latex, surfactant and thickener in a trough 24. A doctor blade 26 is positioned downstream of the applicator roller to control the thickness of the latex film coated onto the belt by the roller 20 by wiping off excess latex which then flows down the blade back into the trough. The latex film on the coated belt is then dried in a circulating hot air dryer 30 in which a series of fans 32 are rotatably housed. The belt with the dried latex film of approximately one-half mil thickness thereon is then passed over rollers 18 and 12 to urethane deposition station 35.

With continued reference to the drawing, the urethane deposition station is seen to include a traversing mixer 36 having the mouth of a downwardly extending spout 37 disposed above conveyor belt 10. Polyol, isocyanate, water and a suitable catalyst are dispensed into this mixer which has a traverse time of one and one-half seconds per stroke. The resultant reactive urethane mixture is deposited onto the dried latex film coated conveyor belt and then smoothed into a reactive layer by a doctor blade 39 located at the deposition station but downstream from the mixer spout.

Simultaneous with the deposition of urethane reactants onto the conveyor belt, a carpet 40 of conventional tufted or woven construction, with exposed tuft loop backs or exposed weave strands held to a fabric backing, is dispensed from a carpet supply roll 42. The carpet backing 41 from which piles 43 freely extend is passed over a tension adjusting roller 44 which is movable in a vertical plane. The carpet is then fed over idler rollers 45 and 46 and is passed over a heater 48 which elevates the backing to a temperature of between 100° F. and 300° F., preferably between 140° and 180° F. The fabric backing is then fed under a roller 50 slightly below the upper surface of the heater which tenses the backing as it passes over the heater.

After the carpet has been heated and linearly tensed its backing is brought into flush contact with the layer of urethane forming reactants at the entrance 52 of a urethane forming station 54 where a series of heated platens 55 are positioned with their upper surfaces substantially horizontally coplanar. The speed of the ladened conveyor belt and of the carpet backing are set so that they pass through the urethane forming station at the same velocity. As they pass together over the heated platens some upward movement of the fabric backing is permitted as the urethane is chemically blown into a cellular material by the generation of carbon dioxide in the urethane curing process. Finally, the carpet, with the blown cellular urethane layer and latex film, is striped from the belt at the exit 56 of station 54, fed over guide roller 58 and finally onto a take-up reel 60.

It should be noted that the urethane reactive mixture is deposited onto belt 10 while the belt is moving in a substantially convex path from drive roller 12, over idler roller 16 and to first heated platen 55. It has been found that by depositing urethane reactants onto belt 10 while it is passing in a substantially convex path, it is possible to eliminate longitudinal wrinkles in the carpet fabric and final product. Heated platens 55 form a substantially horizontal path for curing and blowing of the urethane reactants.

The precise nature of the formulation which forms a film on belt 10 at film coating station 19, or the urethane formulation which forms an integrally bonded urethane cushion for the carpet product is not critical to the present invention. A mixture of acrylic latex and standard compounding additives has been mentioned and it should be obvious that other lattices will function equally as well.

The urethane material is a polymerization product of a mixture of a polyol, a polyisocyanate, water, and a catalyst system that promotes a polymerization reaction between the isocyanate and the polyol to form the polyurethane.

Blowing of the polyurethane composition is effected by controlling the catalyst system, the water concentration and the isocyanate level. Generally, water is present in the reaction mass from between about 0.01 and 5.0 parts per hundred parts polyol, preferably 2 parts to 4 parts, over and above the water normally present in the reaction mixture. The catalyst system not only must effect rapid curing but also must control formation of carbon dioxide resulting from the reaction of water and isocyanate. Blowing should be controlled to effect expansion between about 500 percent and 6400 percent, preferably between about 1600 percent and 3000 percent, so that a carpet back stitch is saturated with reactants and the reactants expand sufficiently prior to curing. Suitable catalysts are those which promote polyurethane formation and concurrently promote the blowing reaction. Preferred catalysts are organic metal compounds, amines, and metal soaps; such catalysts include dibutyl tin dilaurate and stannous octoate.

Suitable polyols which can be employed in the present invention are the polyether polyols having a functionality of at least two, an average molecular weight between about 1000 and 9000 and a hydroxy number less than one hundred. Such polyols include polybutylene glycol, polyethylene glycol, polypropylene glycol, 1.2-polydimethylene glycol, polydecamethylene glycol and mixtures thereof. Preferred polyols have an average molecular weight of between 2000 and 6000, and particularly preferred polyols have a molecular weight of between 3000 and 5000.

A variety of polyisocyanates may be reacted with these polyols to obtain satisfactory polyurethane blown cellular coatings. Particularly suitable polyisocyanates are aromatic diisocyanates as they are more reactive and less toxic than the aliphatic diisocyanates. Such diisocyanates include 2,4-toluene diisocyanate, 2,6-toluene diisocyanate, methane diisocyanate, naphthylene 1,4-diisocyanate, diphenylmethyl-4,4'-diisocyanate, 3,3'-dimethoxy biphenylene diisocyanate, 4,4-diphenylene diisocyanate and mixtures thereof. The diisocyanate usually is employed in stoichiometric excess to assure complete reaction with the functional groups of the polyol and with the water which is present. Preferably from 20 to 80 parts of diiosycanate per one hundred parts of polyol are used in the reaction mixture.

The novel and unique features of the present invention include process steps whereby a tufted or woven primary carpet backing is pre-heated to a temperature of approximately 160° F. and then brought into contact with a urethane forming mixture while the mixture is traveling in a substantially convex path. The urethane forming reactants are then cured and blown into a cellular urethane layer on the carpet primary backing by the application of heat from a series of substantially horizontally coplanar heated platens. The urethane reactant mixture is deposited onto a continuous belt which has been pre-coated with a thin layer of acrylic latex and dried so that the urethane latex, and carpet backing will release easily from the belt at the completion of the process.

With this method carpet cushion has been successfully formed in situ, on a fabric backing with the cellular urethane having a density of between one and ten pounds per cubic foot, a thickness of between one sixteenth and one inch, and an homogeneous cell structure substantially free of cells having a diameter larger than one eighth inch.

It should be understood that the previously described embodiments merely illustrate principles of the invention in selected, preferred form. Many modifications, additions and deletions may, of course, be made thereto without departure from the spirit and scope of the invention as set forth in the following claims.

I claim:

1. A carpet product having a fabric backing and a layer of blown cellular urethane material integrally bonded to the undersurface of said fabric backing, said cellular urethane material having a density of between one pound per cubic foot and ten pounds per cubic foot, a thickness of between one sixteenth of an inch and one inch, an homogeneous cell structure substantially free of cells having a diameter larger than one eighth of an inch, and being substantially free of longitudinal wrinkles.

2. The method of forming a layer of blown cellular urethane on a carpet fabric backing comprising the steps of:
 (a) providing a mixture of reactive urethane forming agents:
 (b) shaping the reactive mixture into a layer;
 (c) bringing a carpet backing which has been pre-heated to a temperature of between 100° F. and 300° F., into flush contact with the layer of reactive mixture; and
 (d) heating the layer of reactive mixture thereby curing and chemically blowing the reactive mixture into an enlarged layer of cellular urethane in situ on the carpet fabric backing, said cellular urethane having a density of between one pound per cubic foot and ten pounds per cubic foot, a thickness of between one sixteenth of an inch and one inch, an homogeneous cell structure substantially free of cells having a diameter larger than one eighth of an inch, and being substantially free of longitudinal wrinkles.

3. The method of claim 2 wherein the step (b) the reactive mixture is shaped into a layer atop a film of dried latex, and wherein in step (c) the layer of mixed reactive urethane forming agents and the dried latex film are contacted compositely to the carpet backing.

4. The method of claim 3 wherein the latex film is formed upon a conveyor belt, and the mixture of reactive urethane forming agents is subsequently deposited upon the formed latex film.

5. The product of claim 3.
6. The product of claim 2.
7. The product of claim 4.
8. The method of forming a blown cellular urethane cushion on a carpet fabric backing comprising the steps of:
 (a) preparing a mixture of reactive urethane forming agents;
 (b) providing a latex film;
 (c) depositing the reactive mixture on the latex film;
 (d) shaping the reactive mixture on the latex film into a layer;
 (e) heating said carpet fabric backing to a temperature of between 100° F. and 300° F.;
 (f) bringing the pre-heated carpet fabric backing into flush contact with the layer of reactive mixture; and
 (g) curing and chemically blowing the reactive mixture sandwiched between the carpet fabric backing and latex film, into a cellular urethane cushion having a density between one pound per cubic foot and ten pounds per cubic foot, a thickness of between one sixteenth of an inch and one inch, an homogeneous cell structure substantially free of cells having a diameter larger than one eighth of an inch, and being substantially free of longitudinal wrinkles.

9. The method of claim 8 wherein in step (b) the latex film is formed on a conveyor belt.

10. The method of claim 9 wherein in step (g) the reactive mixture is cured and chemically blown by passing the conveyor belt, latex film, reactive mixture and carpet over a heating means.

11. Apparatus for forming a layer of blown cellular urethane on a carpet fabric backing, said apparatus comprising:
 an endless conveyor belt;
 means for driving said endless conveyor belt along a conveyor path; means for mixing together reactive urethane forming agents and for depositing the mixture onto the conveyor belt;
 means for shaping the deposited reactive mixture into a layer on the conveyor belt;
 means for pre-heating a carpet fabric backing to a temperature of between 100° F. and 300° F.; second conveyor means for conveying the underside of the pre-heated carpet fabric backing into flush contact with the layer of reactive mixture; and
 means for heating the layer of reactive mixture while it is in flush contact with the carpet fabric backing thereby enabling the reactive mixture to be chemically blown into cellular urethane and bond to the carpet fabric backing.

12. Apparatus in accordance with claim 11 wherein said second conveyor means includes means for conveying the underside of a carpet fabric backing into flush contact with the layer of reactive mixture without substantial relative movement between the carpet fabric backing and the layer of reactive mixture along a portion of said conveyor path while permitting the layer of reactive mixture to blow and thereby enlarge in a direction normal to said portion of said conveyor path.

13. Apparatus in accordance with claim 11 further comprising means for applying a film directly to said endless conveyor belt and means for drying said film.

* * * * *